United States Patent
Haskara et al.

(10) Patent No.: US 6,711,489 B2
(45) Date of Patent: Mar. 23, 2004

(54) METHOD FOR ESTIMATING ENGINE CYLINDER VARIABLES USING SECOND ORDER SLIDING MODES

(75) Inventors: Ibrahim Haskara, Brownstown, MI (US); Lawrence A. Mianzo, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 202 days.

(21) Appl. No.: 10/010,849

(22) Filed: Dec. 5, 2001

(65) Prior Publication Data

US 2003/0105575 A1 Jun. 5, 2003

(51) Int. Cl.[7] .................................................. G05G 7/70
(52) U.S. Cl. ...................... 701/101; 73/115; 73/118.2; 701/108; 701/114; 123/568.14
(58) Field of Search ...................... 73/115, 116, 118.2; 123/568.14; 701/101, 102, 108, 114

(56) References Cited

U.S. PATENT DOCUMENTS

| | | | |
|---|---|---|---|
| 5,515,828 A | | 5/1996 | Cook et al. |
| 5,654,501 A | * | 8/1997 | Grizzle et al. ............. 73/118.2 |
| 5,947,095 A | | 9/1999 | Kato |
| 6,035,639 A | | 3/2000 | Kolmanovsky et al. |
| 6,109,249 A | * | 8/2000 | Wild et al. ............. 123/568.21 |
| 6,115,664 A | * | 9/2000 | Cullen et al. ............... 701/102 |
| 6,311,679 B1 | * | 11/2001 | Druzhinina et al. ... 123/568.21 |

* cited by examiner

Primary Examiner—Willis R. Wolfe
Assistant Examiner—Johnny H. Hoang
(74) Attorney, Agent, or Firm—Brooks Kushman P.C.

(57) ABSTRACT

A method for real time estimation of air charge, residual gas, and backflow in an engine cylinder, i.e., in-cylinder variables, by estimating total mass flow into and out of the cylinders. These estimations are then integrated based on starting and ending times for induction strokes of each cylinder to calculate air charge and residual gas for each cylinder. The method uses intake and exhaust manifold pressure measurements to estimate the in-cylinder variables. The intake and exhaust manifold pressure measurements are processed through the ideal gas law to dynamically determine the net change in the amount of gas inside the manifolds in order to estimate the in-cylinder variables on-line.

13 Claims, 2 Drawing Sheets

METHOD FOR ESTIMATING ENGINE CYLINDER VARIABLES USING SECOND ORDER SLIDING MODES

BACKGROUND OF THE INVENTION

1. Field of the Invention

The present invention provides estimation of in-cylinder conditions for internal combustion engines by processing intake and exhaust pressure measurements.

2. Background Art

Several powertrain control problems for internal combustion engines, like air-fuel ratio and spark timing, are based on conditions within the engine's cylinders. For example, estimation of cylinder air charge is advantageous for controlling air-fuel ratio and torque control. Alternatively, estimation of cylinder residual gas is advantageous for controlling emissions, spark timing, and torque control.

There are several approaches for estimating cylinder air charge and residual gas in a cylinder. One approach expresses cycle average values for these quantities in the form of regressions/polynomial fits. In most cases, regression parameters are based on least squaring experimental data. Despite its practical ease of implementation, regressions/polynomial fits methods produce steady state maps without taking into account transient dynamics adequately. Therefore, these methods are not efficient in the presence of commonly occurring intermediate events like backflow. Backflow is especially important for the air-fuel ratio control design because it appears as an uncertainty in the in-cylinder air-fuel ratio calculation.

Other approaches such as equivalent control based estimation methods are also ineffective. For example, most equivalent control based methods require low-pass filtering which includes sensor bandwidth as a control freedom. The short comings of such an equivalent control based methods is described in greater below.

Broadly, for equivalent control based and sliding mode estimation methods, the ideal gas law is used to obtain estimates for air charge and residual gas in the cylinders by analyzing mass flow into and out of the cylinders through the engine's intake and exhaust manifolds. Accordingly, the ideal gas law is given by:

$$PV = mRT \quad (1)$$

where P equals pressure, V equals volume, m equals gas mass, R equals a universal gas constant, and T equals temperature. Assuming that temperature T remains constant, and using the law of conservation of mass, the ideal gas law can be differentiated to relate pressure rate of change to mass flow into and out of the intake/exhaust manifolds as follows:

$$\frac{dP_i}{dt} = \frac{RT_i}{V_i}(\dot{m}_t - \dot{m}_{ct_{in}}) \quad (2)$$

$$\frac{dP_e}{dt} = \frac{RT_e}{V_e}(\dot{m}_{ct_{out}} - \dot{m}_e) \quad (3)$$

where $P_i$ equals intake manifold pressure, $T_i$ equals intake manifold temperature, $V_i$ equals intake manifold volume, $\dot{m}_t$ equals throttle body mass flow, $\dot{m}_{ct_{in}}$ equals total mass flow into the cylinders from the intake manifold, $P_e$ equals exhaust manifold pressure, $T_e$ equals exhaust manifold temperature, $V_e$ equals exhaust manifold volume, $\dot{m}_e$ equals exhaust manifold mass flow, and $\dot{m}_{ct_{out}}$ equals total mass flow into the exhaust manifold from the cylinders. Mass flow through the throttle body and exhaust manifold can be modeled like flow through an orifice as follows:

$$\dot{m}_t = A_t d_t(P_a, P_i) \quad (4)$$

$$\dot{m}_e = A_e d_e(P_e, P_a) \quad (5)$$

where $A_t$ and $A_e$ equal effective flow areas for the throttle body and exhaust manifold respectively, $P_a$ equals ambient pressure, and $d_t$ and $d_e$ are differential pressure constants. A control objective is formalized from the foregoing as an estimation of cylinder air charge and residual gas from the intake and exhaust manifold pressure measurements.

With respect to equivalent control based estimation methods, consider equation (2) and let equation (6) be associated with Pi, where L is a selectable design parameter as follows:

$$\frac{d\bar{P}_i}{dt} = \frac{RT_i}{V_i}\dot{m}_t + L\,sign(P_i - \bar{P}_i) \quad (6)$$

Subtracting equation (6) from equation (2) yields a error dynamic as follows:

$$\frac{d\tilde{P}_i}{dt} = -\frac{RT_i}{V_i}\dot{m}_{ct_{in}} - L\,sign\tilde{P}_i \quad (7)$$

where $\tilde{P}_i = P_i - \bar{P}_i$. For $$L > \left|\frac{RT_i}{V_i}\dot{m}_{ct_{in}}\right| \quad (8)$$

$\tilde{P}_i$ is steered to and kept at zero. The initial convergence phase is eliminated by selecting $\tilde{P}_i(0) = P_i(0)$.

According to equivalent control methodology, it can be shown that $$-\frac{V_i}{RT_i}\left[L\,sign\tilde{P}_i\right]_{eq} = \dot{m}_{c_{in}}(t) \quad (9)$$

in sliding mode on the manifold $\tilde{P}_i = 0$. Equivalent value operator $[\ ]_{eq}$ outputs the equivalent value of its discontinuous argument which can be broadly defined as the continuous control which would lead to the invariance conditions for the sliding motion which this discontinuous input induces. Theoretically, it can be approximated by suitable low-pass filtering.

An on-line signal for sensing mass flow into the cylinders from the intake manifold and exhaust manifold is then integrated over an engine cycle to obtain total mass flow delivered to the cylinders. The sign of the signal can be further used for detecting backflow. Repeating the same estimation logic for the exhaust manifold yields a signal for the mass flow between the cylinders and the exhaust manifold. By processing the information gathered from the intake and exhaust estimations, the residual gas kept inside the cylinders from the previous cycles can also be calculated. Furthermore, for an engine with no cylinder overlap, the total mass flow into and out of the cylinders can be translated into cylinder air charge and residual gas information for the individual cylinders.

Such equivalent control based estimation, despite its theoretical validity, suffers from the selection requirements of the filter constants not being met in practical situations. This is especially relevant in cases where the sensor data is collected and used at certain time instances in a sampled-data fashion. For example, in the foregoing estimation logic, the pressure sampling rate cannot be enough to switch on the manifold and to extract the equivalent value of the resulting pseudo-discontinuous signal by a low-pass filter unless the pressure sensor bandwidth is accepted as a control freedom. Accordingly, there is a need for an improved on-line differentiation method to estimate air charge, residual gas, and backflow in an engine cylinder from pressure measurements taken from engine's intake and exhaust manifolds.

SUMMARY OF THE INVENTION

The present invention provides a method for real time estimation of air charge, residual gas, and backflow in an engine cylinder by adopting a second order sliding mode differential method that includes estimating total mass flow into and out of the cylinders using second order sliding mode analysis. These estimations are then integrated based on starting and ending times for induction strokes of each cylinder to calculate air charge and residual gas for each cylinder.

The premise of the method of the present invention is to only use intake and exhaust manifold pressure measurements to estimate the air charge, residual gas, and backflow in a cylinder, i.e., the in-cylinder variables. The intake and exhaust manifold pressure measurements are processed through the ideal gas law to dynamically determine the net change in the amount of gas inside the manifolds in order to estimate the in-cylinder variables on-line. For example, the scaled version of intake manifold fluctuations are directly linked to the net flow rate. Ambient pressure, intake manifold pressure, and throttle body details can be used to find the net flow into the intake manifold. The remainder accounts for the amount of flow going into the cylinder. The integration of the positive flow into the cylinder gives the total amount of air charge in the cylinder whereas the negative flow yields the backflow amount. Similarly, the flow out of the cylinder is calculated by the exhaust manifold pressure measurement.

In accordance with the present invention, the air charge in a cylinder can be determined from the following equation:

$$\overline{m}_{cj_{in}}[k] = \int_{ts_{j_{in},k}}^{te_{j_{in},k}} \dot{\overline{m}}_{ct_{in}}(\tau) d\tau$$

where $$\dot{\overline{m}}_{ct_{in}} = \dot{m}_t - \frac{V_i}{RT_i} u_i$$

is the estimated mass flow into the cylinders; $tS_{j_{in},k}$ and $te_{j_{in},k}$ represent the starting and the ending times of the individual intake strokes for the jth cylinder at the kth step, respectively.

Residual gas in a cylinder can be determined from the following equation:

$$\overline{m}_{res,cj}[k] = \overline{m}_{cj_{in}}[k] + m_{fj}[k] - \overline{m}_{cj_{out}}[k]$$

where $\overline{m}_{res,cj}[k]$ = residual gas, $$\overline{m}_{cj_{in}}[k] = \int_{ts_{j_{in},k}}^{te_{j_{in},k}} \dot{\overline{m}}_{ct_{in}}(\tau) d\tau,$$

$$\overline{m}_{cj_{out}}[k] = \int_{ts_{j_{ex},k}}^{te_{j_{ex},k}} \dot{\overline{m}}_{ct_{out}}(\tau) d\tau,$$

$$\dot{\overline{m}}_{ct_{in}} = \dot{m}_t - \frac{V_i}{RT_i} u_i,$$

-continued $$\dot{\overline{m}}_{ct_{out}} = \dot{m}_e + \frac{V_e}{RT_e} u_e,$$

where $ts_{j_{in},k}$ and $te_{j_{in},k}$ represent the starting and the ending times of the individual exhaust strokes for the jth cylinder at the kth step, respectively. $\overline{m}_{ct_{in}}$ is the estimated total mass flow entering the engine cylinders, m, equals throttle body mass flow, $V_i$ equals intake manifold volume, R equals a universal constant, $T_i$ equals intake manifold temperature, and $u_i$ equals an intermediate variable based $\dot{\sigma}_i = u_i - \dot{P}_i$. $\overline{m}_{ct_{out}}$ is the estimated total mass flow exiting the engine cylinders, $m_e$ equals exhaust mass flow, $V_e$ equals exhaust manifold volume, R equals a universal constant, $T_e$ equals intake manifold temperature, and $u_i$ equals an intermediate variable based on $\dot{\sigma}_e = u_e - \dot{P}_e$. $m_{fj}[k]$ denotes fuel mass injected into the jth cylinder at the kth step.

The amount of backflow in a cylinder can be determined by integrating the negative flow from the cylinder to the intake manifold.

The advantages of the method of the present invention are numerous. For example, the method of the present invention use a second order sliding modes based differentiation process which provides an accurate robust derivative of a noisy signal in discrete time in order to estimate the in-cylinder variables. The estimated in-cylinder variables may be used in air-fuel ratio control, spark timing control, internal exhaust gas re-circulation (EGR) control, and the like.

The above-described objects, as well as other objects, features, and advantages of the present invention will be readily apparent from the following detailed description of the detailed description of the preferred embodiment(s) when taken in connection with the accompanying drawings.

DETAILED DESCRIPTION OF THE PREFERRED EMBODIMENTS

Figure 1:
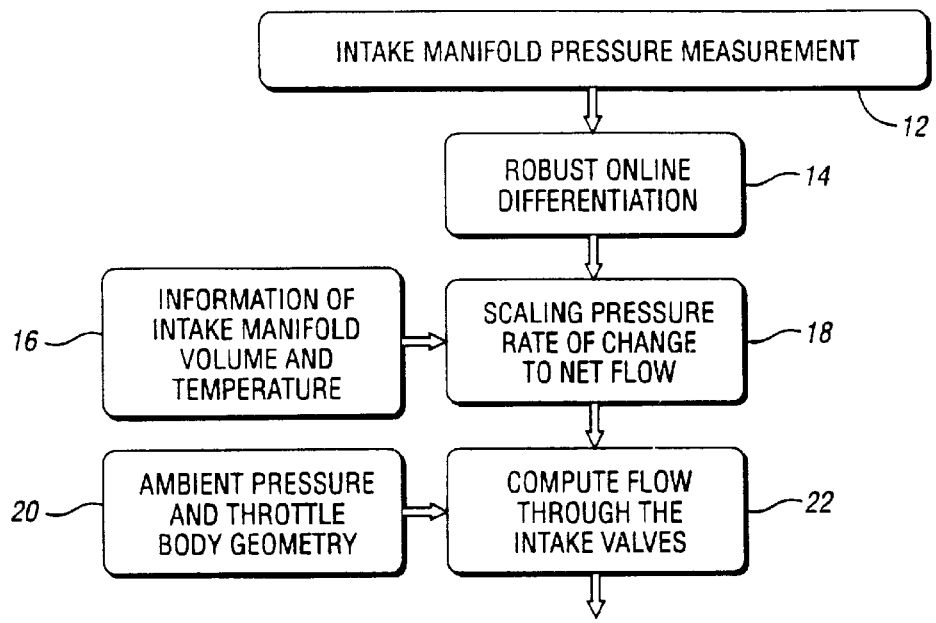
FIG. 1 illustrates a flow-chart for estimating flow through the intake valves of the engine cylinders by processing intake manifold pressure measurements in accordance with the present invention.

In accordance with the present invention, in-cylinder variables such as air charge, residual gas, and backflow are estimated in real time based on second order sliding modes that include a differentiation arrangement for an accurate robust derivative of noisy signals in discrete-time.

Using a second order sliding algorithm according to the present invention, let $$\dot{x}_i = u_i \quad (10)$$

$$u_i = v_i - \lambda_i |x_i - P_i|^{1/2} \text{sign } \sigma_i \quad (11)$$

$$\dot{v}_i = -\alpha_i \text{sign } \sigma_i \quad (12)$$

$$\sigma_i = x_i - P_i \quad (13)$$

be the estimator equations associated with the intake manifold where $x_i$, $u_i$ and $v_i$ are intermediate variables, $\lambda_i$, $\alpha_i$ are constants to be determined. The solutions of Equations (10)–(13) are understood in the Filippov sense. With proper selections of $\lambda_i$ and $\alpha_i$, and $\sigma_i$ and $\dot{q}$ are steered to zero in finite time by acting on $\dot{q}$ and kept at zero afterwards. The existence of suitable $\lambda_i$ and $\alpha_i$ is guaranteed by the existence of a Lipschitz constant for the intake manifold pressure rate of change.

Because, $$\dot{\sigma}_i = u_i - \dot{P}_i \qquad (14)$$

an estimate for the mass flow into the cylinders from the intake manifold, denoted by $\overline{\dot{m}}_{ct_{in}}$ can be obtained in sliding mode by:

$$\overline{\dot{m}}_{ct_{in}} = \dot{m}_i - \frac{V_i}{RT_i} u_i \qquad (15)$$

where, $P_i$ equals intake manifold pressure, $T_i$ equals intake manifold temperature, $V_i$ equals intake manifold volume, $\dot{m}_t$ equals throttle body mass flow, $\dot{m}_{ct_{in}}$ equals total mass flow into the cylinders from the intake manifold, $P_e$ equals exhaust manifold pressure, $T_e$ equals exhaust manifold temperature, $V_e$ equals exhaust manifold volume, $\dot{m}_e$ equals exhaust manifold mass flow, and $\dot{m}_{ct_{out}}$ equals total mass flow into the exhaust manifold from the cylinders. As is known in the art, the foregoing values are measured with sensors.

FIG. 1 incorporates the foregoing and presents a flow-chart for estimating flow through the intake valves of the engine cylinders by processing intake manifold pressure measurements in accordance with the present invention. At block 12, intake manifold pressure $P_i$ is measured with an intake manifold pressure sensor. At block 14, a robust second order sliding modes differentiation method is used to convert the intake manifold pressure sensor measurement of block 12, which is typically noisy, into a discrete time value. At block 16, intake manifold volume $V_i$ is known and intake manifold temperature $T_i$ is measured with an intake manifold temperature sensor. At block 18, the ideal gas law derivation for scaling pressure rate of change to net flow is incorporated as shown in equation (2). At block 20, ambient pressure $P_a$ is measured and the throttle body geometry is modeled as an orifice as shown in equation (4). At block 22, analysis according to the present invention is used to estimate flow through the intake valves of the cylinders, i.e., estimated mass flow into the cylinders from the intake manifold, as shown in equation (15).

The same equations can be used to obtain the mass flow through the exhaust valves of the cylinders to the exhaust manifold as follows:

$$\dot{x}_e = u_e \qquad (16)$$

$$u_e = v_e - \lambda_e |x_e - P_e|^{1/2} \operatorname{sign} \sigma_e \qquad (17)$$

$$\dot{v}_e = -\alpha_e \operatorname{sign} \sigma_e \qquad (18)$$

$$\sigma_e = x_e - P_e \qquad (19)$$

so that $$\overline{\dot{m}}_{ct_{out}} = \dot{m}_e + \frac{V_e}{RT_e} u_e \qquad (20)$$

where $x_e$, $u_e$, and $v_e$ are intermediate variables, $\lambda_e$, $\alpha_e$ are the estimator parameters and $\overline{\dot{m}}_{ct_{out}}$ is the estimated total mass flow from the cylinders to the exhaust manifold.

Figure 2:
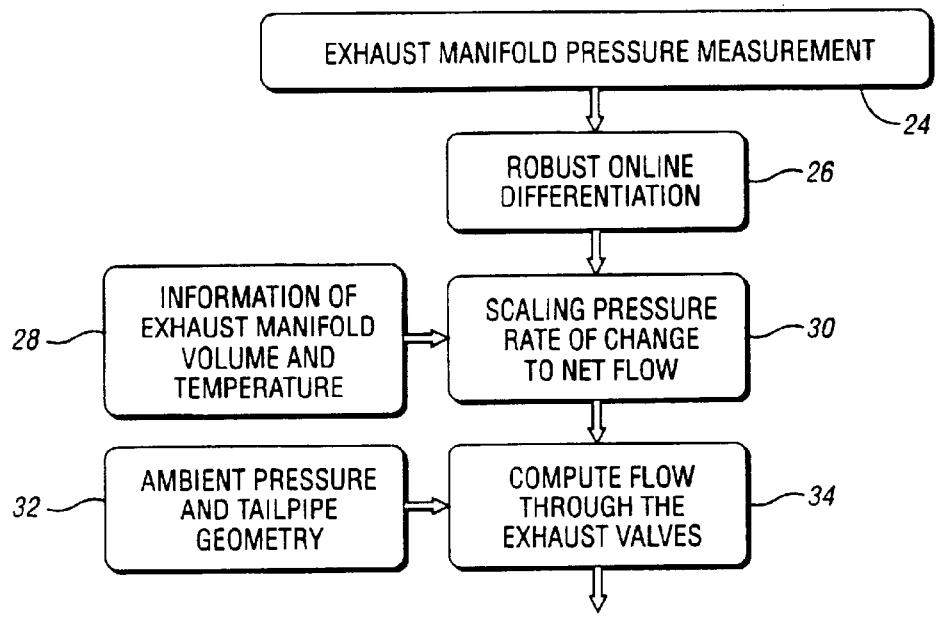
FIG. 2 illustrates a flow-chart for estimating flow through the exhaust valves of the engine cylinders by processing exhaust manifold pressure measurements in accordance with the present invention.

FIG. 2 incorporates the foregoing and presents a flow-chart for estimating flow through the exhaust valves of the engine cylinders by processing exhaust manifold pressure measurements in accordance with the present invention. At block 24, exhaust manifold pressure $P_e$ is measured with an exhaust manifold pressure sensor. At block 26, a robust second order sliding modes differentiation method used to convert the sensor measurement of block 24, which is typically noisy, into a discrete time value. At block 28, exhaust manifold volume $V_e$ is known and exhaust manifold temperature $T_e$ is measured with another sensor. At block 30, the ideal gas law derivation for scaling pressure rate of change to net flow is incorporate as shown in equation (3). At block 32, ambient pressure $P_a$ is measured and the throttle body geometry is molded as an orifice as shown in equation (5). At block 34, analysis according to the present invention is used to compute flow through the exhaust valves, i.e., estimated total mass flow from the cylinders to the exhaust manifold, as shown in equation (20).

For an engine with no overlap, total flow in and out of all the cylinders can be partitioned into flow in and out of individual cylinders by processing the estimate signals according to the intake and exhaust valve event timings. Integrating the resulting individual signals over the induction and exhaust strokes of each cylinder, the mass delivered from the intake manifold and expelled to the exhaust manifold at any cycle can be obtained.

Let $\overline{m}_{cj_{in}}[k]$ and $\overline{m}_{cj_{out}}[k]$ denote the estimated mass pumped into and out of the jth cylinder at the kth engine cycle, respectively. It can be noted that $$\overline{m}_{cj_{in}}[k] = \int_{ts_{j_{in},k}}^{te_{j_{in},k}} \overline{\dot{m}}_{ct_{in}(\tau)} d\tau \qquad (21)$$

$$\overline{m}_{cj_{out}}[k] = \int_{ts_{j_{ex},k}}^{te_{j_{ex},k}} \overline{\dot{m}}_{ct_{out}(\tau)} d\tau \qquad (22)$$

where $ts_{j_{in},k}$ and $te_{j_{in},k}$ represent the starting and the ending times of the induction strokes for the jth cylinder at the kth step, respectively whereas $ts_{j_{ex},k}$ and $te_{j_{ex},k}$ have the same meaning for the individual exhaust strokes. $\overline{\dot{m}}_{ct_{in}}$ and $\overline{\dot{m}}_{ct_{out}}$ are estimated as in the Equations (15) and (20).

The residual gas inside the cylinder, denoted by $\overline{m}_{res,cj}$, can be estimated by subtracting the exhausted gas amount from the sum of the air charge pumped in the cylinder and the fuel injected in the cylinder at each cycle, i.e., $$\overline{m}_{res,cj}[k] = \overline{m}_{cj_{in}}[k] + m_{f_j}[k] - \overline{m}_{cj_{out}}[k] \qquad (23)$$

where, $m_{f_j}[k]$ denotes fuel mass injected into the jth cylinder at the kth step.

Backflow can also be calculated by integrating the negative flow from the cylinder to the intake manifold. For implementation purposes, estimator equations are computed in synchronous with the pressure measurement instances. The integrations of the mass flow estimates to obtain the air mass estimates represented in equation (21)–(22) are also carried out in discrete-time during the particular intake or exhaust stroke.

Figure 3:
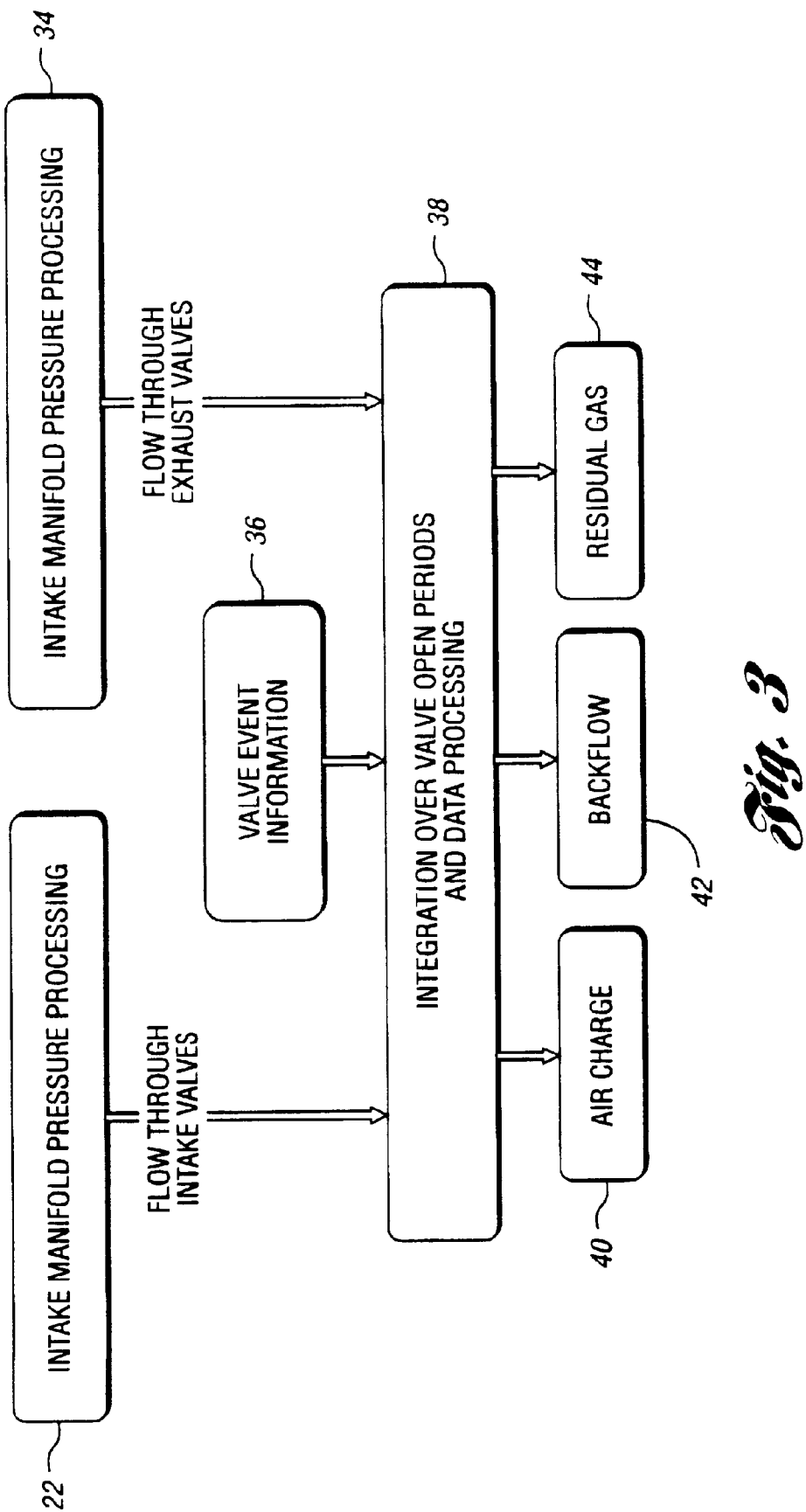
FIG. 3 illustrates a flow-chart for estimating air charge, residual gas, and backflow in accordance with the present invention.

FIG. 3 illustrates a flow-chart of logic for estimating air charge, residual gas, and backflow in accordance with the present invention. At block 36 the valve event timings for the induction strokes are determined in a method common to the art. At block 38, the information provided by blocks 22, 34, and 38 are analyzed in accordance with the present invention to determine the residual gas of the intake and exhaust manifolds as shown in equations (21) and (22) respectively. At block 40, air charge is determine in accordance with equation (21). At block 42, backflow is determined by integrating the negative flow from equations (21) and (22) for the intake and exhaust manifolds respectively.

At block 44, residual gas in each cylinder is determined according to equation (23).

In the derivation of the above equations, it has been implicitly assumed that pressure sampling rate is faster than the induction/exhaust duration rates so that the integration calculations of equation (21)–(22) make sense mathematically.

In summary, the estimation performed in accordance with the present invention provides accurate estimates in the presence of measurement noise with discrete-time implementation without accepting pressure sensor bandwidth as a control freedom.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for estimating residual gas in each cylinder of an internal combustion engine, the method comprising:

estimating total mass flow entering into cylinders of the engine by processing intake pressure measurements;

estimating total mass flow exiting from cylinders of the engine by processing exhaust pressure measurements;

determining mass flow into each cylinder by integrating the estimated total mass flow entering into the cylinders based on starting and ending times for induction strokes of each cylinder;

determining mass flow exiting from each cylinder by integrating the estimated total mass flow exiting from the cylinders based on starting and ending times for exhaust strokes of each cylinder; and determining residual gas in each one of the cylinders by subtracting from the integrally determined mass flow entering into one of the cylinders the integrally determined mass flow exiting from the one of the cylinders.

2. The method of claim 1, wherein the second order sliding mode equation is determined according to the following equations:

$$\dot{x} = u$$

$$u = v - \lambda |x-P|^{1/2} \operatorname{sign} \sigma$$

$$\dot{v} = -\alpha \operatorname{sign} \sigma$$

$$\sigma = x - P$$

where x, u and v are intermediate variables, $\lambda$, $\alpha$ are constants to be determined, and $\lambda$ and $\alpha$ are selected in Filippov reuse to steer $\sigma$ and $\dot{\sigma}$ to zero in finite time by acting on $\sigma$, wherein the existence of $\lambda$ and $\alpha$ is guaranteed by the existence of a Lipschitz constant.

3. The method of claim 2, wherein the step of estimating total mass flow entering into the engine cylinders results in the following equation:

$$\hat{\dot{m}}_{ct_{in}} = \dot{m}_t - \frac{V_i}{RT_i} u_i$$

where $\overline{\dot{m}}_{ct_{in}}$ is the estimated total mass flow entering the engine cylinders, $m_t$ equals throttle body mass flow, $V_i$ equals intake manifold volume, R equals a universal constant, $T_i$ equals intake manifold temperature, and $u_i$ equals an intermediate variable based on $u_i = \dot{\sigma}_i + \dot{P}_i$.

4. The method of claim 3, wherein estimating total mass flow exiting from the engine cylinders results in the following equation:

$$\hat{\dot{m}}_{ct_{out}} = \dot{m}_e + \frac{V_e}{RT_e} u_e$$

where $\overline{\dot{m}}_{ct_{out}}$ is the estimated total mass flow exiting the engine cylinders, $m_e$ equals exhaust mass flow, $V_e$ equals exhaust manifold volume, R equals a universal constant, $T_e$ equals intake manifold temperature, and $u_e$ equals an intermediate variable based on $u_e = \dot{\sigma}_e + \dot{P}_e$.

5. The method of claim 4, wherein determining mass flow entering into each cylinder by integrating the estimated total mass flow entering into the cylinders based on starting and ending times for induction strokes of each cylinder results in the following equation:

$$\overline{m}_{cj_{in}}[k] = \int_{ts_{j_{in}},k}^{te_{j_{in}},k} \hat{\dot{m}}_{ct_{in}}(\tau) d\tau$$

where $ts_{j_{in}}{}^k$ and $te_{j_{in}}{}^k$ represent the starting and the ending times of the induction strokes for the jth cylinder at the kth step.

6. The method of claim 5, wherein determining mass flow exiting from each cylinder by integrating the estimated total mass flow exiting from the cylinders based on starting and ending times for induction strokes of each cylinder results in the following equation:

$$\overline{m}_{cj_{out}}[k] = \int_{ts_{j_{ex}},k}^{te_{j_{ex}},k} \hat{\dot{m}}_{ct_{out}}(\tau) d\tau$$

where $ts_{j_{in}}{}^k$ and $te_{j_{in}}{}^k$ represent the starting and the ending times of the induction strokes for the jth cylinder at the kth step.

7. The method of claim 6, wherein determining residual gas in each cylinder by subtracting from the integrally determined mass flow entering into one of the cylinders the integrally determined mass flow exiting from the one of the cylinders results in the following equation:

$$\overline{m}_{res,cj}[k] = \overline{m}_{cj_{in}}[k] + m_{fj}[k] - \overline{m}_{cj_{out}}[k]$$

where $m_{fj}[k]$ denotes the fuel mass ingested to the jth cylinder at the kth step.

8. The method of claim 1, wherein determining residual gas in each one of the cylinders includes subtracting from the integrally determined mass flow entering into one of the cylinders the integrally determined mass flow exiting from the one of the cylinders and adding the fuel mass entering into the one of the cylinders.

9. A method for estimating air charge in each cylinder of an internal combustion engine, the method comprising:

using second order sliding modes to differentiate intake and exhaust pressures;

estimating total mass flow entering into cylinders of the engine by processing the intake and exhaust pressures; and determining mass flow into each cylinder by integrating the estimated total mass flow entering into the cylinders based on starting and ending times for induction strokes of each cylinder.

10. The method of claim 9 wherein, the second order sliding mode equation is determined according to the following equations:

$$\dot{x} = u$$

$$u = v - \lambda |x-P|^{1/2} \text{sign}\sigma$$

$$\dot{v} = -\alpha \text{sign}\sigma$$

$$\sigma = x - P$$

where x, u and v are intermediate variables, $\lambda$, $\alpha$ are constants to be determined, and $\lambda$ and $\alpha$ are selected in Filippov reuse to steer $\sigma$ and $\dot\sigma$ to zero in finite time by acting on $\sigma$, wherein the existence of $\lambda$ and $\alpha$ is guaranteed by the existence of a Lipschitz constant.

11. The method of claim 10, wherein the step of estimating total mass flow entering into the engine cylinders results in the following equation:

$$\bar{\dot{m}}_{ct_{in}} = \dot{m}_t - \frac{V_i}{RT_i} u_i$$

where $\bar{\dot{m}}_{ct_{in}}$ is the estimated total mass flow entering the engine cylinders, $m_t$ equals throttle body mass flow, $V_i$ equals intake manifold volume, R equals a universal constant, $T_i$ equals intake manifold temperature, and $u_i$ equals an intermediate variable based on $u_i = \dot\sigma_i + P_i$.

12. The method of claim 11, wherein determining mass flow entering into each cylinder by integrating the estimated total mass flow entering into the cylinders based on starting and ending times for induction strokes of each cylinder results in the following equation:

$$\bar{m}_{c_{j_{in}}}[k] = \int_{ts_{j_{in},k}}^{te_{j_{in},k}} \bar{\dot{m}}_{ct_{in}}(\tau) d\tau$$

where $ts_{j_{in},k}$ and $te_{j_{in},k}$ represent the starting and the ending times of the induction strokes for the jth cylinder at the kth step.

13. The method of claim 9 further comprising:

estimating total mass flow exiting from cylinders of the engine;

determining mass flow exiting from each cylinder by integrating the estimated total mass flow exiting from the cylinders based on starting and ending times for induction strokes of each cylinder; and determining residual gas in each one of the cylinders by subtracting from the integrally determined mass flow entering into one of the cylinders the integrally determined mass flow exiting from the one of the cylinders.

* * * * *